United States Patent [19]
Nagai et al.

[11] Patent Number: 5,721,633
[45] Date of Patent: Feb. 24, 1998

[54] ELECTROCHROMIC DEVICE AND MULTILAYER GLAZING

[75] Inventors: Junichi Nagai, Yokohama; Tetsuya Seike, Tokyo, both of Japan

[73] Assignee: Asahi Glass Company Ltd., Tokyo, Japan

[21] Appl. No.: 616,252

[22] Filed: Mar. 15, 1996

[30] Foreign Application Priority Data

Mar. 17, 1995 [JP] Japan ................................ 7-059285

[51] Int. Cl.[6] .................................................. G02F 1/153
[52] U.S. Cl. ................................................... 359/274
[58] Field of Search ................................. 359/273, 274

Primary Examiner—David C. Nelms
Assistant Examiner—Thomas Robbins
Attorney, Agent, or Firm—Oblon, Spivak, McClelland, Maier & Neustadt, P.C.

[57] ABSTRACT

An electrochromic device of wholly solid type comprising a transparent substrate and a transparent electroconductive film formed on the substrate, and having an oxidation color forming oxide, a cation conductive layer as an electrolyte, a reduction color forming oxide and a transparent electroconductive film, formed sequentially on said transparent electroconductive film formed on the substrate, wherein:

(1) the oxidation color forming oxide is a p-type semiconductor of nickel oxide or cobalt oxide, (2) the cation conductive layer has OH groups showing a peak at about 3,300 (1/cm) in its infrared reflectance spectrum and is made of proton conductive $SbO_c$ wherein $1.3 \leq c \leq 2.7$, or at least one lithium conductive lithium-containing oxide of $LiO_dMO_e$ wherein $0.01 \leq d \leq 1.0$, $1.3 \leq e \leq 2.7$, and M is an element selected from the group consisting of Nb, Sb, B, P, Si, Ge, Al, Ce, La and Zr and (3) the reduction color forming oxide is tungsten oxide, molybdenum oxide or titanium oxide.

11 Claims, 16 Drawing Sheets

ELECTROCHROMIC DEVICE AND MULTILAYER GLAZING

BACKGROUND OF THE INVENTION

1. Field of the Invention

The present invention relates to an electrochromic device (ECD) of wholly solid type.

2. Discussion of Background

Among conventional dimmers employing electrochromism, those excellent in weather resistance are all wholly solid types based on inorganic materials, including the following types:

(1) glass/ITO/IrO$_2$:Sn/Ta$_2$O$_5$/WO$_3$/ITO/adhesive resin/ glass (transmission type device), (2) glass/ITO/IrO$_2$:Sn/Ta$_2$O$_5$/WO$_3$/Al/adhesive resin/ glass (reflection type device), (3) glass/ITO/NiO/Ta$_2$O$_5$/WO$_3$/Al/adhesive resin/glass (reflection type device).

In each of them, WO$_3$ is used as a reduction color forming layer, and the electrolyte is a proton electrolyte layer of Ta$_2$O$_5$. As such, they have had the following drawbacks.

(1) The bond strength at the interface of Ta$_2$O$_5$/WO$_3$ is weak, and peeling is likely to occur.

(2) Ta$_2$O$_5$ hardly forms a hydrate when the film is to be formed by a PVD method, and it is difficult to obtain a film having high proton conductivity. Accordingly, it is not possible to increase the changeable range of the transmittance or the reflectance of the ECD.

(3) Further, the film-forming speed of Ta$_2$O$_5$ is slow even when either electron beam vapor deposition or sputtering is used for the film-forming.

SUMMARY OF THE INVENTION

It is an object of the present invention to solve the above-mentioned problems of the prior art.

The present invention provides an electrochromic device of wholly solid type comprising a transparent substrate and a transparent electroconductive film formed on the substrate, and having an oxidation color forming oxide, a cation conductive layer as an electrolyte, a reduction color forming oxide and a transparent electroconductive film, formed sequentially on said transparent electroconductive film formed on the substrate, wherein:

(1) the oxidation color forming oxide is a p-type semiconductor of nickel oxide or cobalt oxide, (2) the cation conductive layer has OH groups showing a peak at about 3,300 (1/cm) in its infrared reflectance spectrum and is made of proton conductive SbO$_c$ wherein $1.3 \leq c \leq 2.7$, or at least one lithium conductive lithium-containing oxide of LiO$_d$MO$_e$ wherein $0.01 \leq d \leq 1.0$, $1.3 \leq e \leq 2.7$, and M is an element selected from the group consisting of Nb, Sb, B, P, Si, Ge, Al, Ce, La and Zr, and (3) the reduction color forming oxide is tungsten oxide, molybdenum oxide or titanium oxide.

Further, the present invention provides a multilayer glazing having the following layers laminated from the outdoor side to the indoor side between a pair of glass sheets:

A$_1$) an electrochromic device layer of wholly solid type comprising a transparent substrate and a transparent electroconductive film formed on the substrate, and having an oxidation color forming oxide, a cation conductive layer as an electrolyte, a reduction color forming oxide and a transparent electroconductive film, formed sequentially on said transparent electroconductive film formed on the substrate, wherein:

(1) the oxidation color forming oxide is a p-type semiconductor of nickel oxide or cobalt oxide, (2) the cation conductive layer has OH groups showing a peak at about 3,300 (1/cm) in its infrared reflectance spectrum and is made of proton conductive SbO$_c$ wherein $1.3 \leq c \leq 2.7$, or at least one lithium conductive lithium-containing oxide of LiO$_d$MO$_e$ wherein $0.01 \leq d \leq 1.0$, $1.3 \leq e \leq 2.7$, and M is an element selected from the group consisting of Nb, Sb, B, P, Si, Ge, Al, Ce, La and Zr, and (3) the reduction color forming oxide is tungsten oxide, molybdenum oxide or titanium oxide;

B$_1$) a layer of an interlayer film;

C$_1$) a layer of a glass sheet;

D$_1$) a layer of a dry gas; and

E$_1$) a layer of a low radiation film.

Still further, the present invention provides a multilayer glazing having the following layers laminated from the outdoor side to the indoor side between a pair of glass sheets:

A$_2$) a layer of a low radiation film;

B$_2$) a layer of a dry gas;

C$_2$) a layer of a glass sheet;

D$_2$) an electrochromic device layer of wholly solid type comprising a transparent substrate and a transparent electroconductive film formed on the substrate, and having an oxidation color forming oxide, a cation conductive layer as an electrolyte, a reduction color forming oxide and a transparent electroconductive film, formed sequentially on said transparent electroconductive film formed on the substrate, wherein:

(1) the oxidation color forming oxide is a p-type semiconductor of nickel oxide or cobalt oxide, (2) the cation conductive layer has OH groups showing a peak at about 3,300 (1/cm) in its infrared reflectance spectrum and is made of proton conductive SbO$_c$ wherein $1.3 \leq c \leq 2.7$, or at least one lithium conductive lithium-containing oxide of LiO$_d$MO$_e$ wherein $0.01 \leq d \leq 1.0$, $1.3 \leq e \leq 2.7$, and M is an element selected from the group consisting of Nb, Sb, B, P, Si, Ge, Al, Ce, La and Zr, and (3) the reduction color forming oxide is tungsten oxide, molybdenum oxide or titanium oxide; and E$_2$) a layer of an interlayer film.

DETAILED DESCRIPTION OF THE PREFERRED EMBODIMENTS

Figure 1:
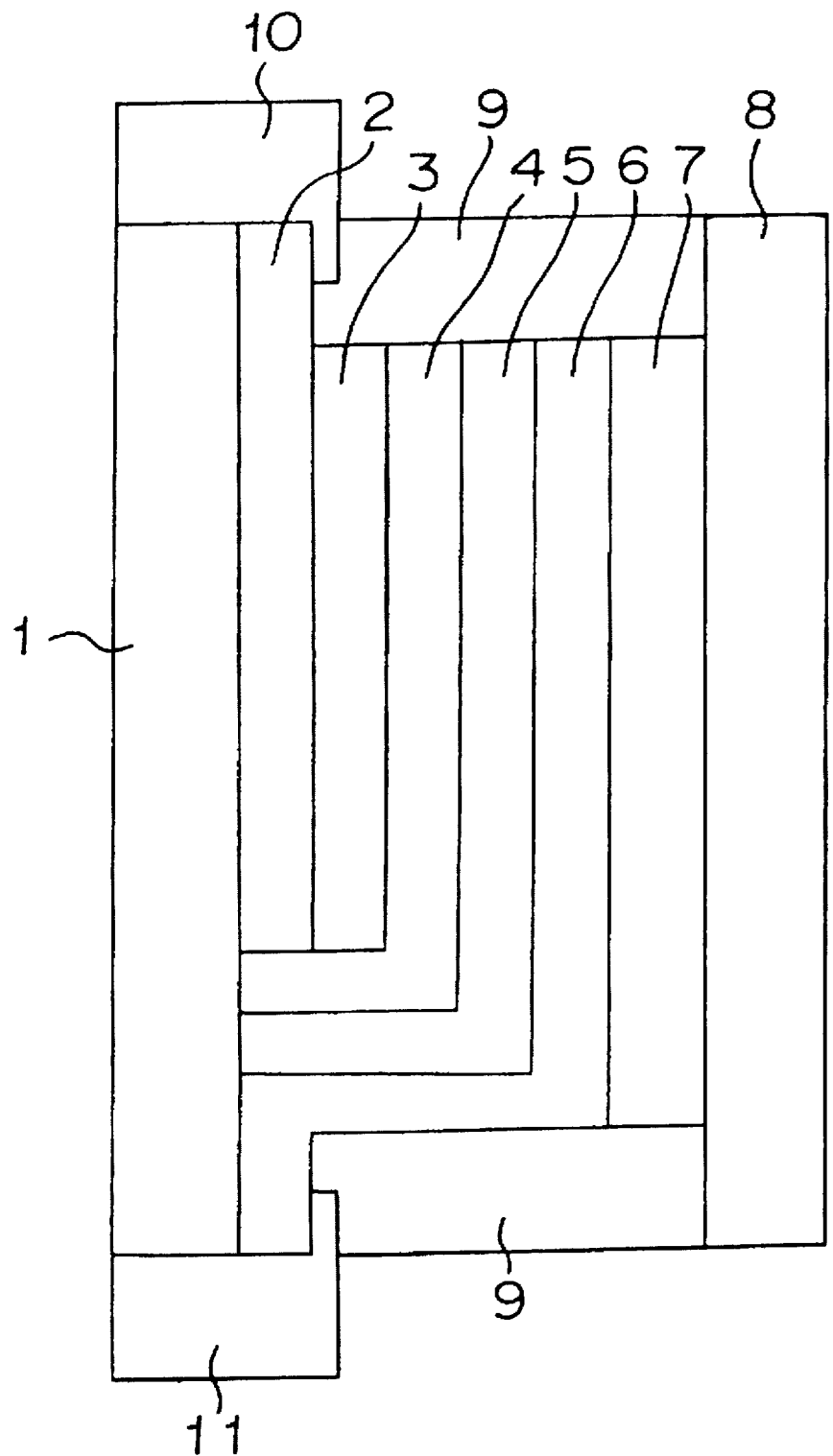
FIG. 1 is a cross sectional view of an ECD glazing of the present invention.

FIG. 1 shows a cross sectional structure of an ECD glazing of the present invention. A transparent substrate 1 is made of a transparent medium such as glass or a plastic such as PMMA (polymethyl methacrylate) or PET (polyethylene terephthalate), and a transparent electroconductive film 2 is made of e.g. ITO ($In_2O_3$:Sn), $SnO_2$:F, or ZnO:Ga.

An oxidation color-forming oxide 3 is a p-type semiconductor such as $NiO_a$ wherein $0.9 \leq a \leq 1.1$, or $CoO_b$ wherein $0.9 \leq b \leq 1.1$. Particularly preferred is NiO or CoO from the viewpoint of high coloring efficiency and high durability. NiO exhibits an electrochromic nature upon transfer of $OH^-$. Here, it is preferred that the electrolyte is $LiNbO_3$, since the electrochromic nature of NiO is thereby readily activated.

A cation conductive layer 4 as an electrolyte has OH groups showing a peak at about 3,300 (1/cm) in its infrared reflectance spectrum and is made of proton conductive $SbO_c$ wherein $1.3 \leq c \leq 2.7$, or at least one lithium conductive lithium-containing oxide of $Li_dMO_e$ wherein $0.01 \leq d \leq 1.0$, $1.3 \leq e \leq 2.7$, and M is an element selected from the group consisting of Nb, Sb, B, P, Si, Ge, Al, Ce, La and Zr. It is preferably a hydrated oxide of $SbO_c$, such as $Sb_2O_3 \cdot nH_2O$, $Sb_2O_5 \cdot nH_2O$, $Sb_6O_{13} \cdot nH_2O$, or $Sb_2O_4 \cdot nH_2O$, wherein n is from 0.01 to 5, or $LiNbO_3 \cdot nH_2O$ wherein n is from 0.01 to 10, since the cation conductivity is thereby high.

A reduction color forming oxide 5 is preferably $WO_3$, $MoO_3$ or $TiO_2$ in view of a good coloring property and high durability.

A transparent electroconductive film 6 is preferably made of ITO, F-doped $SnO_2$ or Ga-doped ZnO in view of a high visible light transmittance and high electroconductivity. A transparent adhesive resin 7 may, for example, be a resin such as an ethylene/vinyl acetate copolymer (EVA), polyvinyl acetal, an epoxy resin, an acrylic resin, a silicone resin or a polyurethane resin.

Reference numeral 8 indicates a transparent substrate on the opposite side, which is made of e.g. glass. A peripheral seal 9 is intended to protect the layers of the oxide color forming oxide 3 to the transparent adhesive resin 7 from the moisture or humidity in the atmosphere and is made of a single seal or a plurality of seals using e.g. an epoxy resin or a butyl rubber having a low moisture permeability.

An electroconductive busbar electrode 10 may be made of an electroconductive metal such as Al, Cu, Ti or stainless steel, or may be the one prepared by coating and baking an electroconductive paste. It is in ohmic contact with the electroconductive film 2 and is used to conduct an electric current to the conductive film 2 or to receive an electric current from the electroconductive film 2. Likewise, an electroconductive busbar electrode 11 is made of the same material and plays the same role as the busbar electrode 10.

In the present invention, the light control or dimming is carried out by means of an EC material which exhibits color formation or extinction due to electrochemical oxidation-reduction. In FIG. 1 showing the cross sectional view of an ECD glazing, when a direct current voltage is applied so that the busbar electrode 10 will be +1.5 V to the busbar electrode 11, a positive electric potential will be applied to the layer of the oxidation color forming oxide 3 (e.g. NiO) and a negative electric potential will be applied to the layer of the reduction color forming oxide 5 (e.g. $WO_3$), and the following EC reactions will take place in the respective layers.

$xOH^- + NiO \text{(transparent)} \longrightarrow NiO(OH)_x \text{(grayish black)} + xe^-$

$yM^+ + ye + WO_3 \text{(transparent)} \longrightarrow MyWO_3 \text{(blue)}$
$(M^+ = H^+, Li^+)$ The oxidation color forming oxide 3 and the reduction color forming oxide 5 will form the colors simultaneously, whereby the device as a whole exhibits a formation of a neutral color of gray type. In the cation conductive layer 4 (e.g. $SbO_c$) as an electrolyte layer, $H^+$ will be conducted as shown by the following formula.

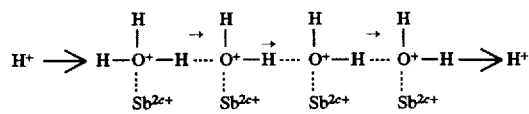

$$H^+ \longrightarrow H-\underset{Sb^{2c+}}{O^+}-H \cdots \underset{Sb^{2c+}}{O^+}-H \cdots \underset{Sb^{2c+}}{O^+}-H \cdots \underset{Sb^{2c+}}{O^+}-H \longrightarrow H^+$$

It is considered that $H^+$ is conducted and injected into the layer of the reduction color forming oxide 5, while $OH^-$ is conducted in a direction opposite to the direction of $H^+$ and injected into the layer of the oxidation color forming oxide 3.

When the polarity of the applied voltage is reversed, or when the electroconductive busbars 10 and 11 are short-circuitted, the above EC reactions will proceed in the opposite directions, and the respective layers will return to the original transparent states. The transmittance of the ECD glazing and the injected quantity of electricity are in a certain specific relation, so that the transmittance can be controlled optionally by adjusting the injected quantity of electricity. The colored state has a memory characteristic whereby it will be maintained for a certain period of time even when the circuit is made open.

Now, the present invention will be described in further detail with reference to Examples of the present invention (Examples 1 to 3) and Comparative Example (Example 4). However, it should be understood that the present invention is by no means restricted to such specific Examples.

EXAMPLE 1

$LiNbO_{2.9}$ Electrolyte Type ECD

EXAMPLE 1-a

Preparation and Evaluation of $LiNbO_{2.9}$ Electrolyte

Using sodalime silica glass as the transparent substrate 1 in FIG. 1, ITO with 10 $\Omega/\square$ was coated as the transparent electroconductive film 2 thereon. A lithium-containing oxide film of $LiNbO_3$ was formed thereon by RF magnetron reactive sputtering.

This $LiNbO_{2.9}$ was formed by using a $LiNbO_3$ target having a diameter of 6 inch under a total pressure of 20 mTorr with a gas mixture of Ar and $O_2$ (Ar:$O_2$=4:1) with an applied power of 500 W. The film-forming speed was 0.071 nm/sec, and the film thickness was 341.6 nm.

Figure 2:
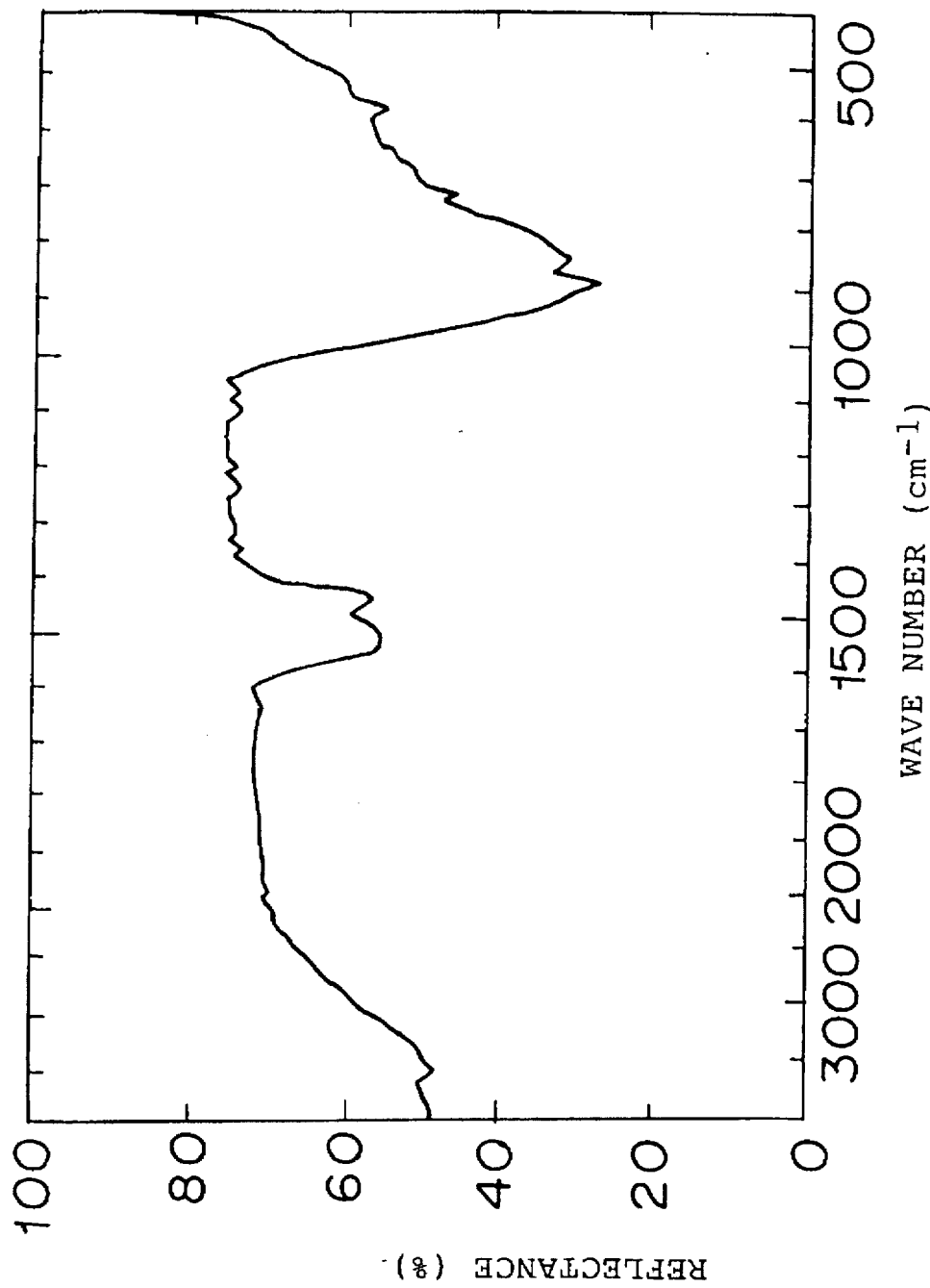
FIG. 2 represents an example of the present invention and is a graph showing the infrared reflectance characteristics of LiNbO$_{2.9}$/ITO/glass.

FIG. 2 shows the infrared reflectance spectrum of $LiNbO_{2.9}$/ITO/glass by P-polarized light from the $LiNbO_{2.9}$ film side at an angle of incidence of 70°. In the Figure, the absorption at about 3,300 (1/cm) is attributable to the molecular vibration of O—H of adsorbed water, and the absorption at about 900 (1/cm) is attributable to the lattice vibration of Nb—O. Further, the absorption at about 1,500 (1/cm) is attributable to the molecular vibration of H—O—H, and the presence of this peak means that substantially bulky water is present in the film.

The majority of such adsorbed water will remain stably even when the layer of the transparent electroconductive film 6 in FIG. 1 is fired in vacuum at 250° C. for 30 minutes in the film-forming step. Accordingly, $LiNbO_{2.9}$ thus formed may more accurately be represented by a hydrated oxide of $LiNbO_3 \cdot nH_2O$, and it is thermally stable as a lithium-proton electrolyte.

EXAMPLE 1-b

Preparation and Evaluation of a $LiNbO_{2.9}$ Electrolyte Type ECD

On a glass (30×30 cm) as the transparent substrate 1, ITO with a sheet resistance of 10 $\Omega/\square$ was coated as the transparent electroconductive film 2. Under the film-forming conditions as identified in Table 1, a NiO film was formed as the oxidation color forming oxide 3 by electron beam vapor deposition using NiO as the starting material, and sequentially by sputtering, a $LiNbO_{2.9}$ film (RF sputtering using a $LiNbO_3$ target) as the cation conductive layer 4, a $WO_3$ film (DC sputtering using a W target) as the reduction color forming oxide 5 and an ITO film (DC sputtering using an ITO target) as the transparent electroconductive film 6 were formed, to obtain an ECD having a five layer structure.

Using an EVA film (250 μm) as the transparent adhesive resin 7, the dimmer was laminated to a glass sheet as the transparent substrate 8 by vacuum heating, and a peripheral seal 9 was applied by an epoxy resin seal. The busbar electrode 10 and the busbar electrode 11 were formed by Selasolza (tradename, manufactured by Asahi Glass Company Ltd.), to obtain an ECD glazing.

Figure 5:
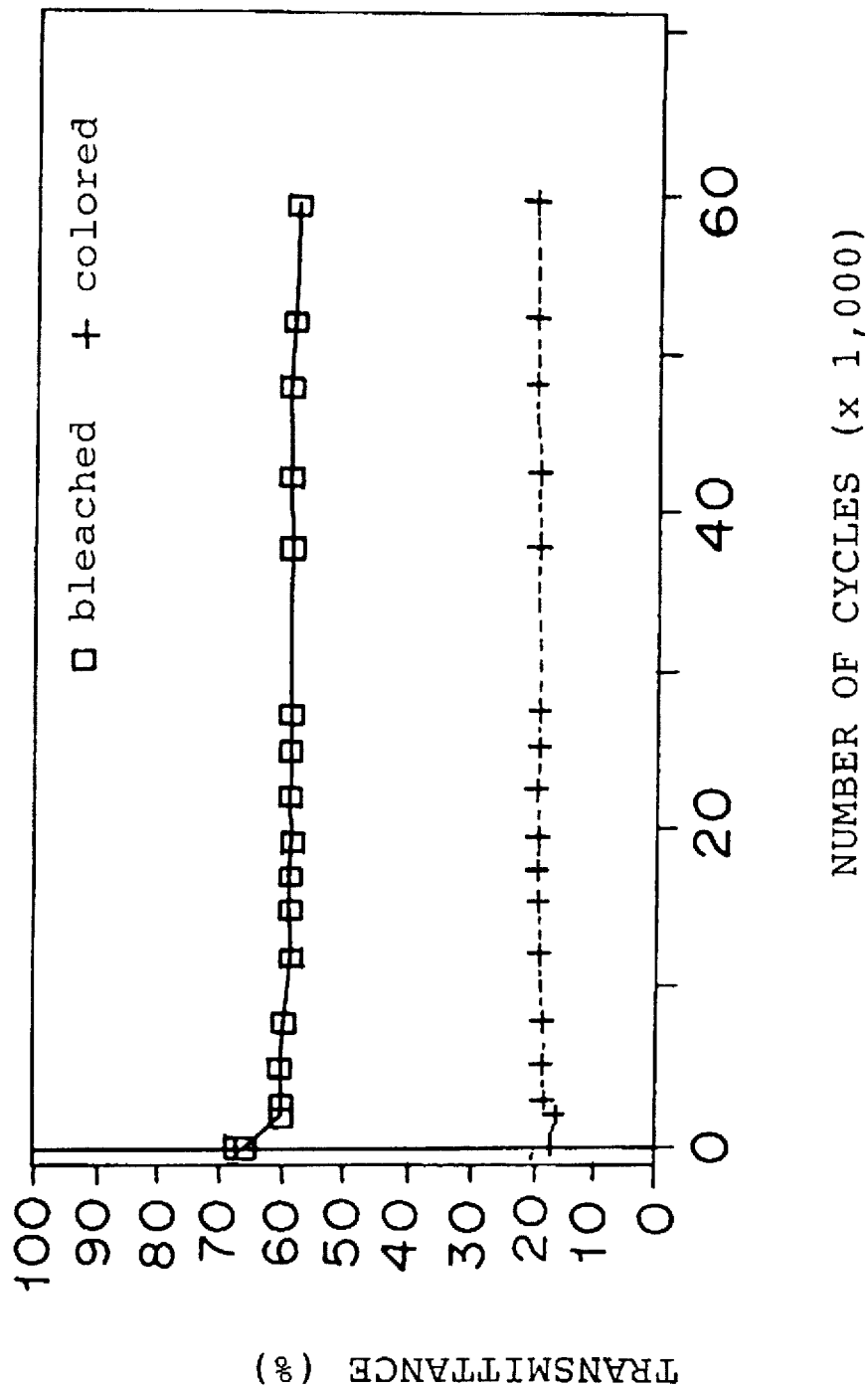
FIG. 5 represents an example of the present invention and is a graph showing the change in transmittance when an ECD glazing using a LiNbO$_{2.9}$ electrolyte was subjected to a driving test at room temperature.

FIG. 5 shows the results of a cycle driving test of this ECD glazing at room temperature. The bleached transmittance decreases a little immediately after initiation of the cycle driving test, but thereafter, the device was operated stably with the change in transmittance being within a range of from 20 to 60%, and no substantial drift was observed in the colored transmittance at room temperature. Even after driving 70,000 times, no deterioration was observed on the appearance of the device.

Figure 6:
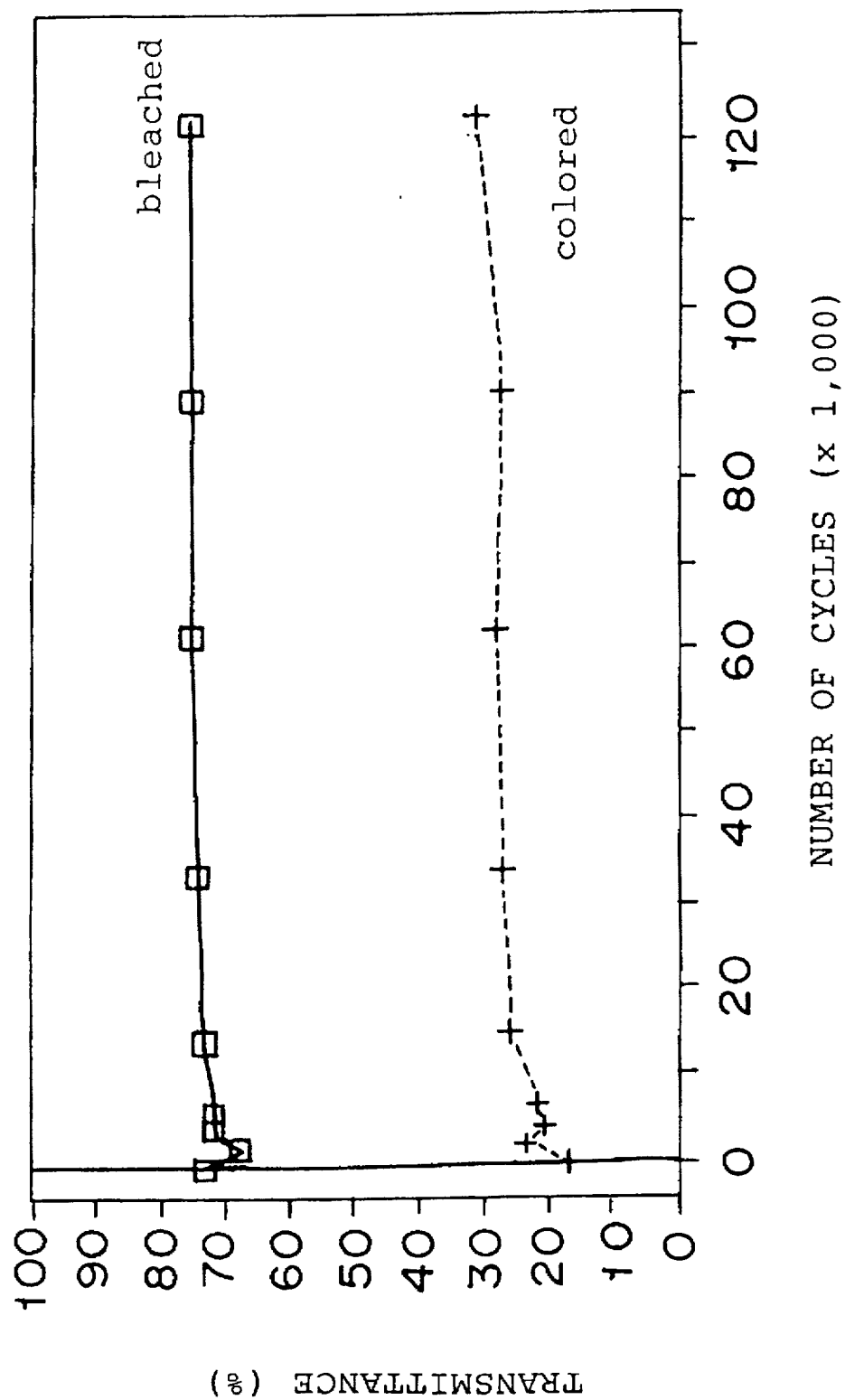
FIG. 6 represents an example of the present invention and is a graph showing the change in transmittance when an ECD glazing using a LiNbO$_{2.9}$ electrolyte was subjected to a driving test at 60° C.

FIG. 6 shows the results of a cycle driving test of this ECD glazing at 60° C. Even after driving 100,000 times, the cycle driving was continued under a stabilized condition with the transmittance being within a range of from 30 to 75%, and no deterioration was observed on the appearance.

Further, this ECD glazing was put in an intensive energy xenon weather meter (Model XEL-1WN, manufactured by Suga Shikenki K.K.), and a continuous ultraviolet ray irradiation test was carried out from the transparent substrate 1 side, whereby even after expiration of 2,000 hours, the operation was normal, and no deterioration was observed on the appearance. Thus, this ECD glazing can be said to have excellent properties including the results of the above durability test.

Further, ECD glazings were prepared in the same manner as in Example 1 except that Nb in the $LiNbO_{2.9}$ film as the cation conductive layer 4 was changed to Sb, B, P, Si, Ge, Al, Ce, La or Zr, and various properties (T1 to T6) thereof are shown in Table 5.

(T1) Change in the visible light transmittance (the minimum value to the maximum value, %).

(T2) Drift (%) due to room temperature of the colored transmittance during the cycle driving test for 70,000 times.

(T3) Appearance after the cycle driving test for 70,000 times. o: no change, Δ: slightly turbid, ×: entirely turbid.

(T4) Drift (%) due to room temperature of the colored transmittance during the cycle driving test for 100,000 times at 60° C.

(T5) Appearance after the cycle driving test for 100,000 times at 60° C. o: No change, Δ: slightly turbid, ×: entirely turbid.

(T6) The ECD glazing was put into an intensive energy xenon weather meter (Model XEL-1WN, manufactured by Suga Shikenki K.K.), and a continuous ultraviolet ray irradiation test was carried out from the transparent substrate 1 side, whereby the appearance was observed after expiration of 2,000 hours. o: No change, Δ: slightly turbid, ×: entirely turbid.

(T7) Film-forming speed (Å/s).

Further, ECD glazings were prepared by using a $LiNbO_{2.9}$ film as the cation conductive layer 4, CoO as the oxidation color forming oxide and MoO or TiO as the reduction color forming oxide, and various properties (T8 to T10) thereof are shown in Table 6.

(T8) Change in the visible light transmittance (the minimum value to the maximum value, %).

(T9) Change (%) in the colored transmittance after the cycle driving test for 100,000 times.

(T10) The ECD glazing was put in an intensive energy xenon weather meter (Model XEL-1WN, manufactured by Suga Shikenki K.K.), and a continuous ultraviolet ray irradiation test was carried out from the transparent substrate 1 side, whereby the change in the appearance upon expiration of 2,000 hours, was observed.

EXAMPLE 2

$SbO_{2.4}$ Electrolyte Type ECD

EXAMPLE 2-a

Preparation and Evaluation of $SbO_{2.4}$ Electrolyte

Using sodalime silica glass as the transparent substrate 1 in FIG. 1, ITO with 10 Ω/□ was coated as the transparent electroconductive film 2 thereon. Then, a $SbO_{2.4}$ film was formed as the cation conductive layer 4 thereon by DC magnetron reactive sputtering. This $SbO_{2.4}$ film was formed by using a Sb target having a diameter of 6 inch under a partial pressure of 20 mTorr with a gas mixture of Ar and $O_2$ ($Ar:O_2=1:1$) with an applied power of 100 W. The film-forming speed was 0.47 nm/sec, and the film thickness was 648 nm.

Figure 3:
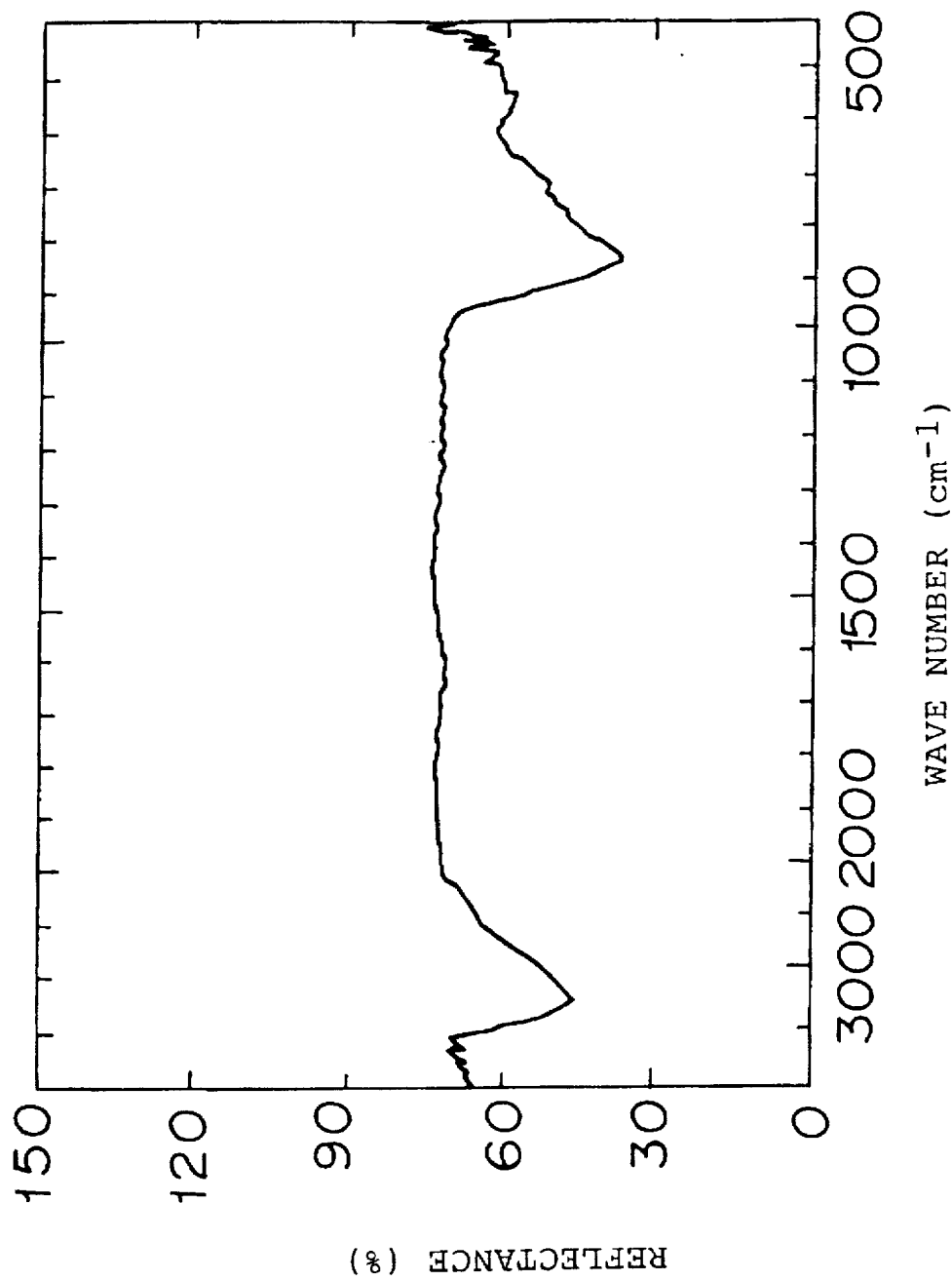
FIG. 3 represents an example of the present invention and is a graph showing the infrared reflectance characteristics of SbO$_{2.4}$/ITO/glass immediately after the film formation.
Figure 4:
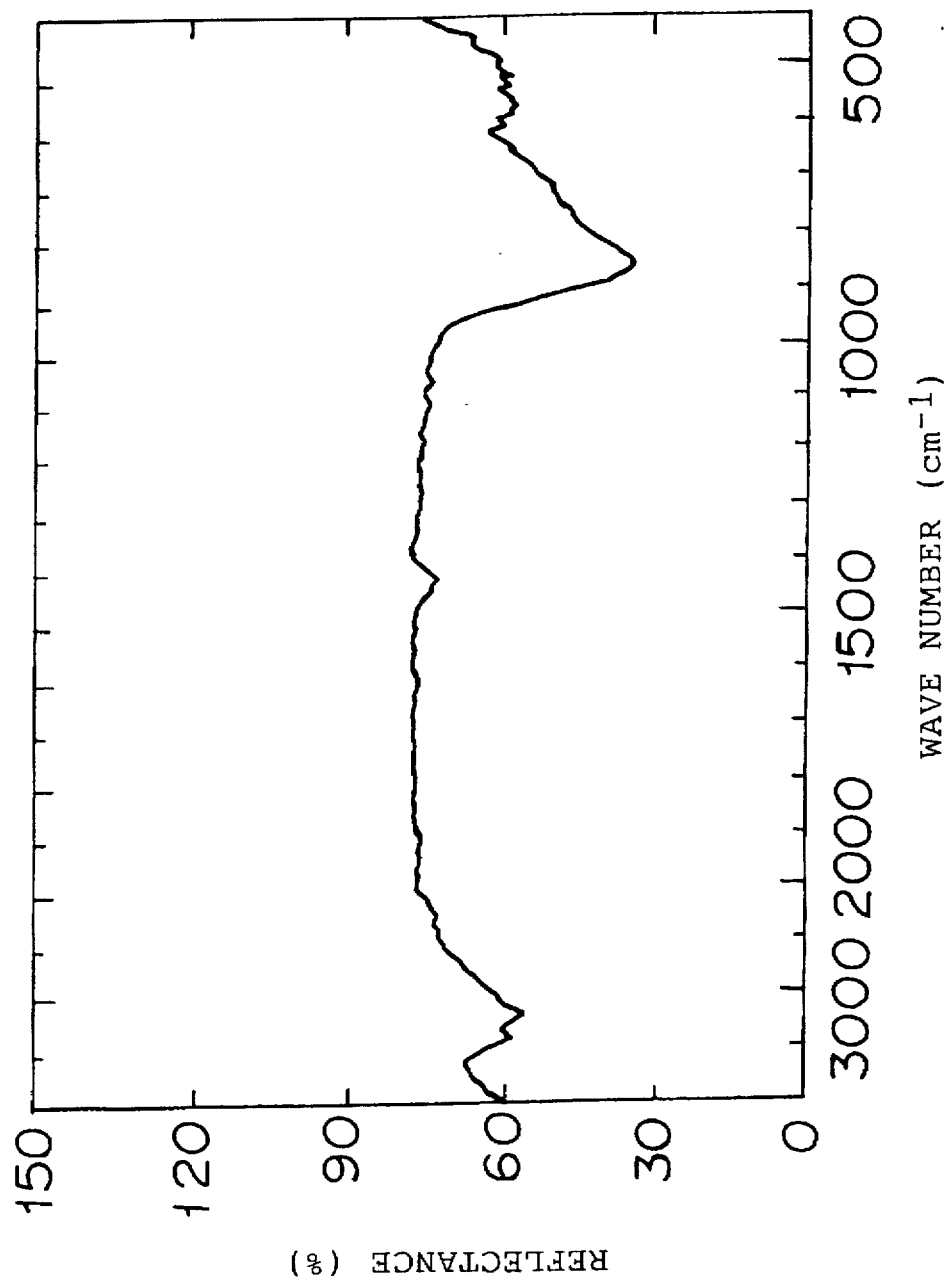
FIG. 4 represents an example of the present invention and is a graph showing the infrared reflectance characteristics of SbO$_{2.4}$/ITO/glass after vacuum firing.

FIGS. 3 and 4 show infrared reflectance spectra of $SbO_{2.4}$/ITO/glass by P-polarized light from the $SbO_{2.4}$ film side at an angle of incidence of 70°. Here, FIG. 3 shows the spectrum immediately after the film formation, and FIG. 4 shows the spectrum after the film was fired in vacuum at 250° C. for 30 minutes in the film-forming step of the layer of the transparent conductive film 6 in FIG. 1. In the Figure, the absorption at about 3,300 (1/cm) is attributable to the molecular vibration of O—H of adsorbed water, and the absorption at about 900 (1/cm) is attributable to the lattice vibration of Sb—O. The fact that the absorption by O—H remains after the vacuum firing, means that the adsorbed water remains thermally stably in the film. The $SbO_{2.4}$ film thus formed can be said to be a better proton electrolyte than $Ta_2O_5$.

EXAMPLE 2-b

Preparation and Evaluation of a $SbO_{2.4}$ Electrolyte Type ECD

On a glass sheet (30×30 cm) as the transparent substrate 1, ITO with a sheet resistance of 10 Ω/□ was coated as the transparent electroconductive film 2. On this transparent electroconductive substrate, under the film forming conditions as identified in Table 2, a NiO film was formed as the oxidation color forming oxide 3 by electron beam vapor deposition using NiO as the starting material, and sequentially by sputtering, a $SbO_{2.4}$ film (DC sputtering using a Sb target) as the cation conductive layer 4, a $WO_3$ film (DC sputtering using a W target) as the reduction color forming oxide 5 and an ITO film (DC sputtering using an ITO target) as the transparent electroconductive film 6 were formed, to obtain an ECD having a five layer structure.

Using an EVA film (250 μm) as the transparent adhesive resin 7, a glass sheet as the transparent substrate 8 was laminated with the ECD by vacuum heating, and the peripheral seal 9 was applied by an epoxy resin seal. The busbar electrode 10 and the busbar electrode 11 were formed by Selasolza (tradename, manufactured by Asahi glass Company Ltd.) to obtain an ECD glazing.

Figure 7:
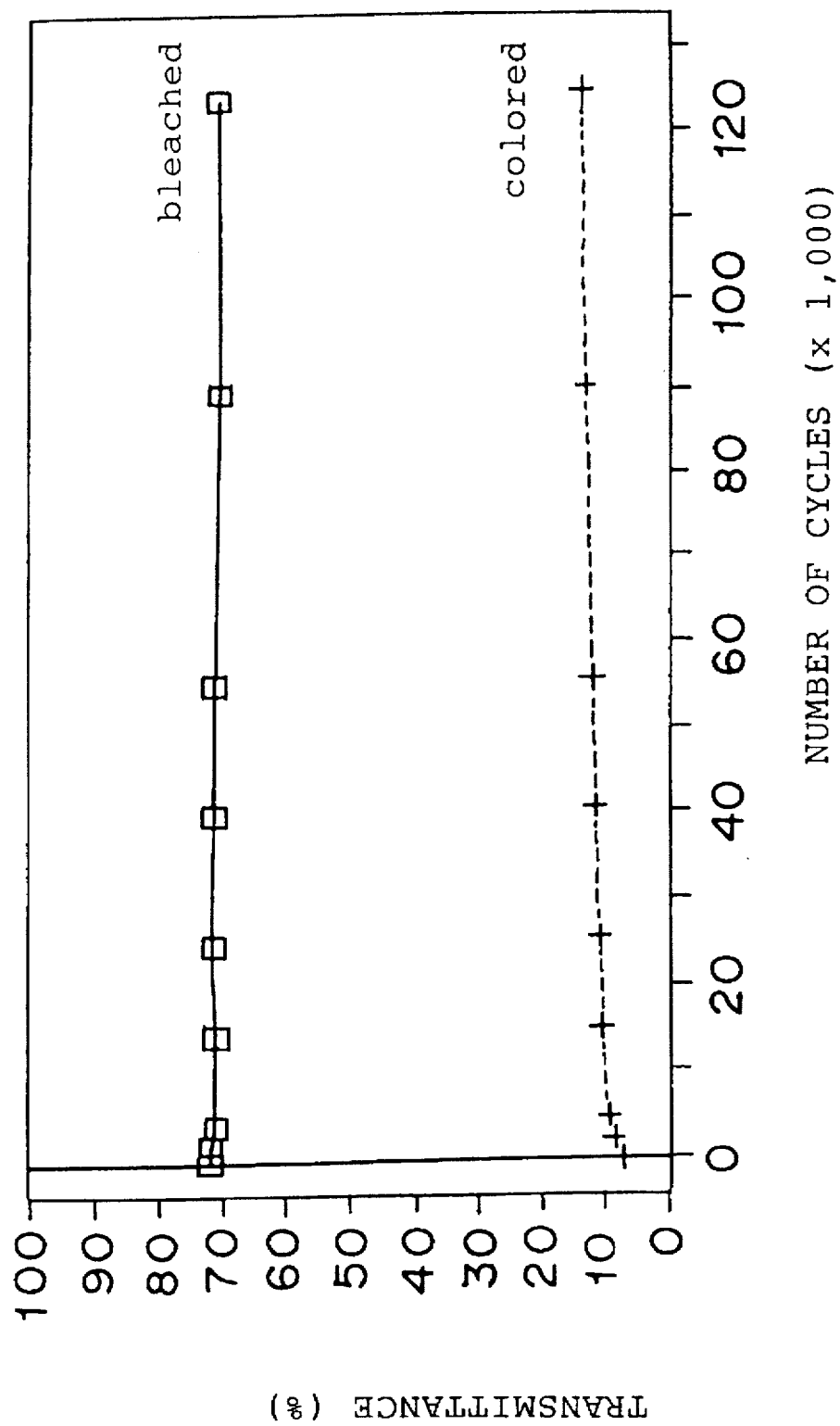
FIG. 7 represents an example of the present invention and is a graph showing the change in transmittance when an ECD glass using a $SbO_{2.4}$ electrolyte was subjected to a driving test at 60° C.

FIG. 7 shows the results of a cycle driving test at 60° C. of this ECD glazing. The colored transmittance increases immediately after initiation of the cycle driving test, but thereafter, the operation is stabilized with the change in the transmittance being within a range of from 15 to 70%, and no substantial drift was observed in the colored transmittance due to room temperature. Even after driving 120,000 times, no deterioration was observed in the appearance of the device.

Figure 8:
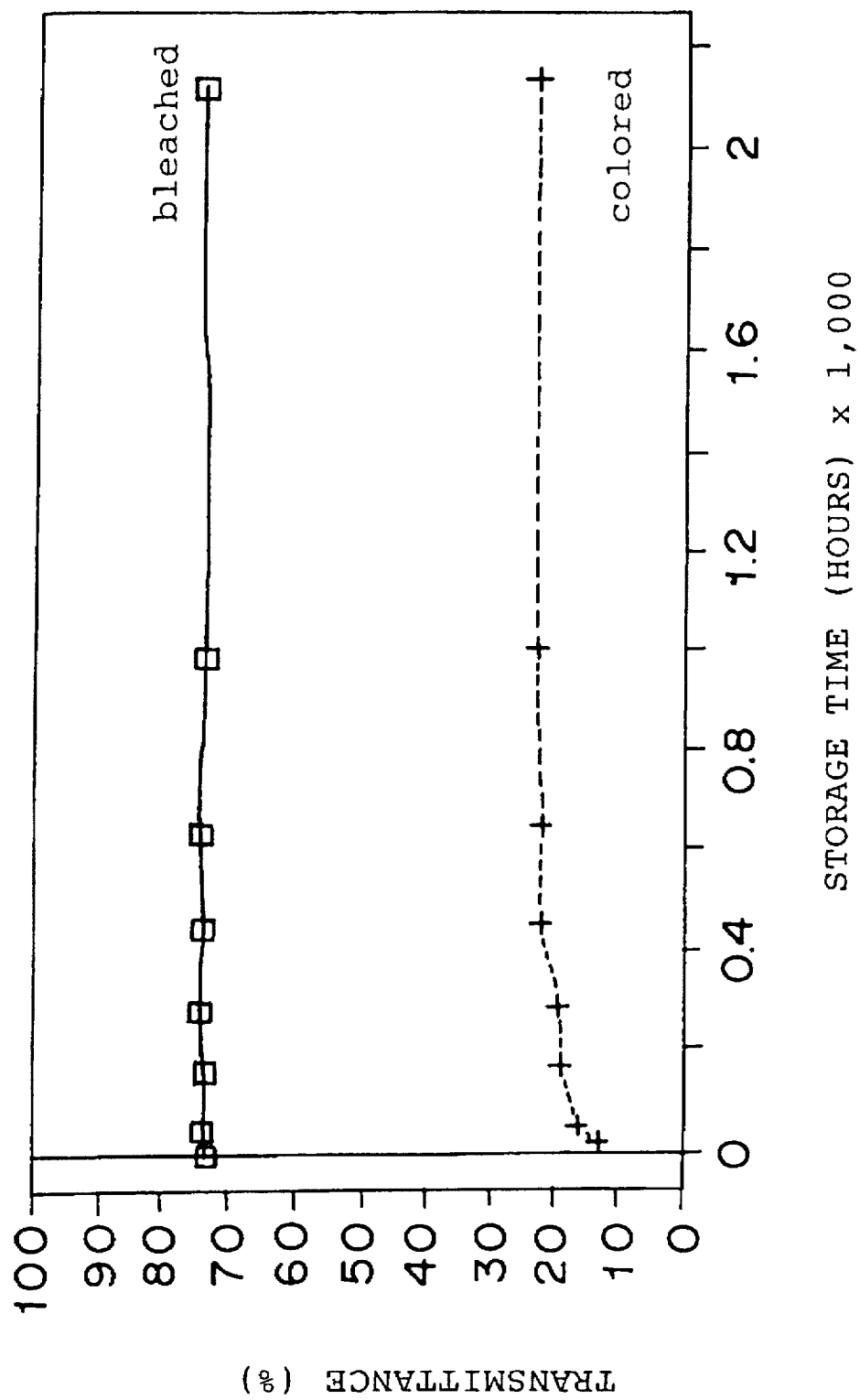
FIG. 8 represents an example of the present invention and is a graph showing the change in transmittance when an ECD glazing using a $SbO_{2.4}$ electrolyte was subjected to a weather resisting driving test.

Further, as shown in FIG. 8, when this ECD glazing was put in an intensive energy xenon weather meter (Model XEL-1WN, manufactured by Suga Shikenki K.K.), and a continuous ultraviolet ray irradiation test was carried out from one side, even after expiration of 2,000 hours, the ECD glazing operated normally, and no deterioration was observed on its appearance. Therefore, this ECD glazing can be said to have excellent properties including the results of the above durability test.

Figure 9:
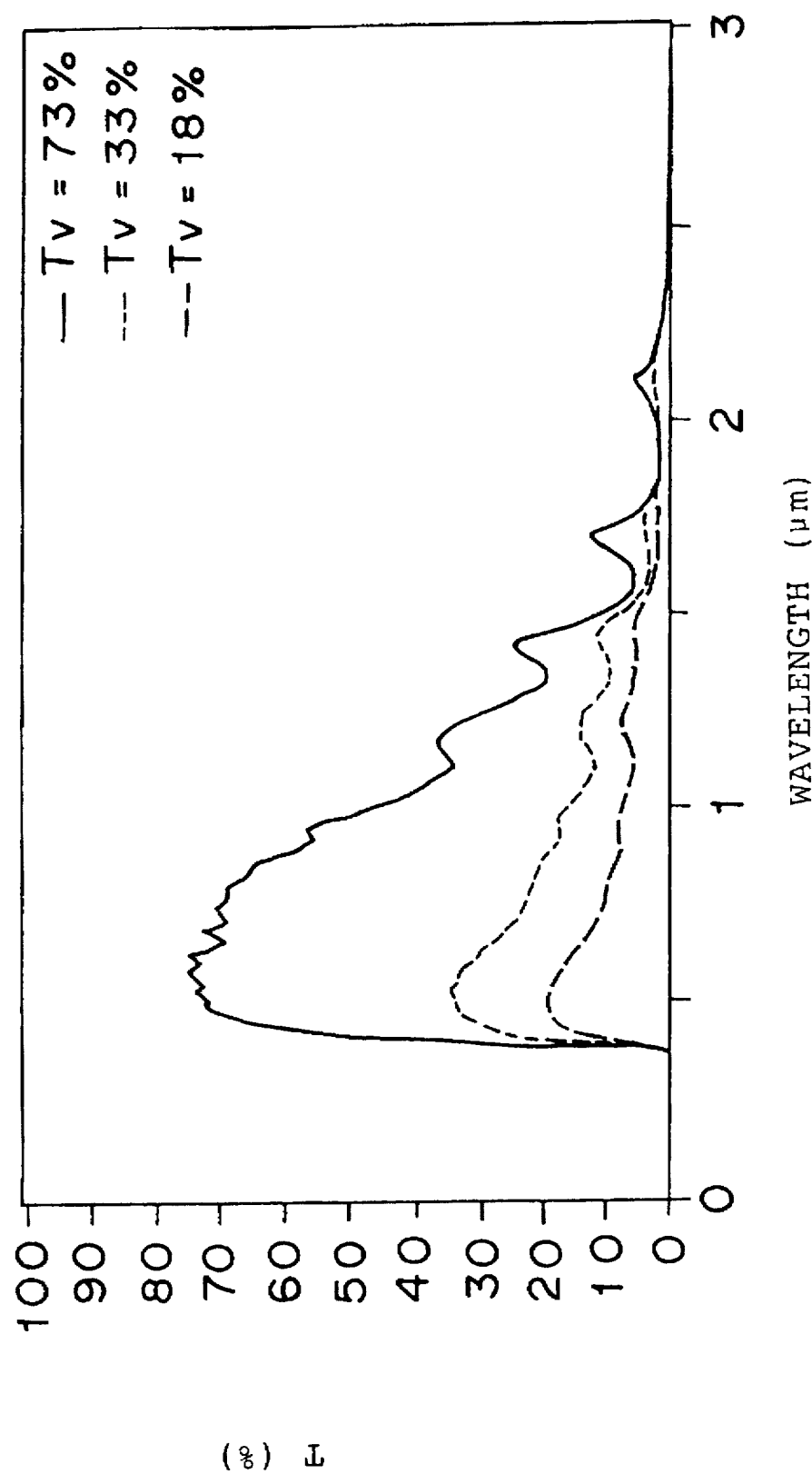
FIG. 9 represents an example of the present invention and is a graph showing the transmittance spectrum of an ECD glazing using a $SbO_{2.4}$ electrolyte.
Figure 10:
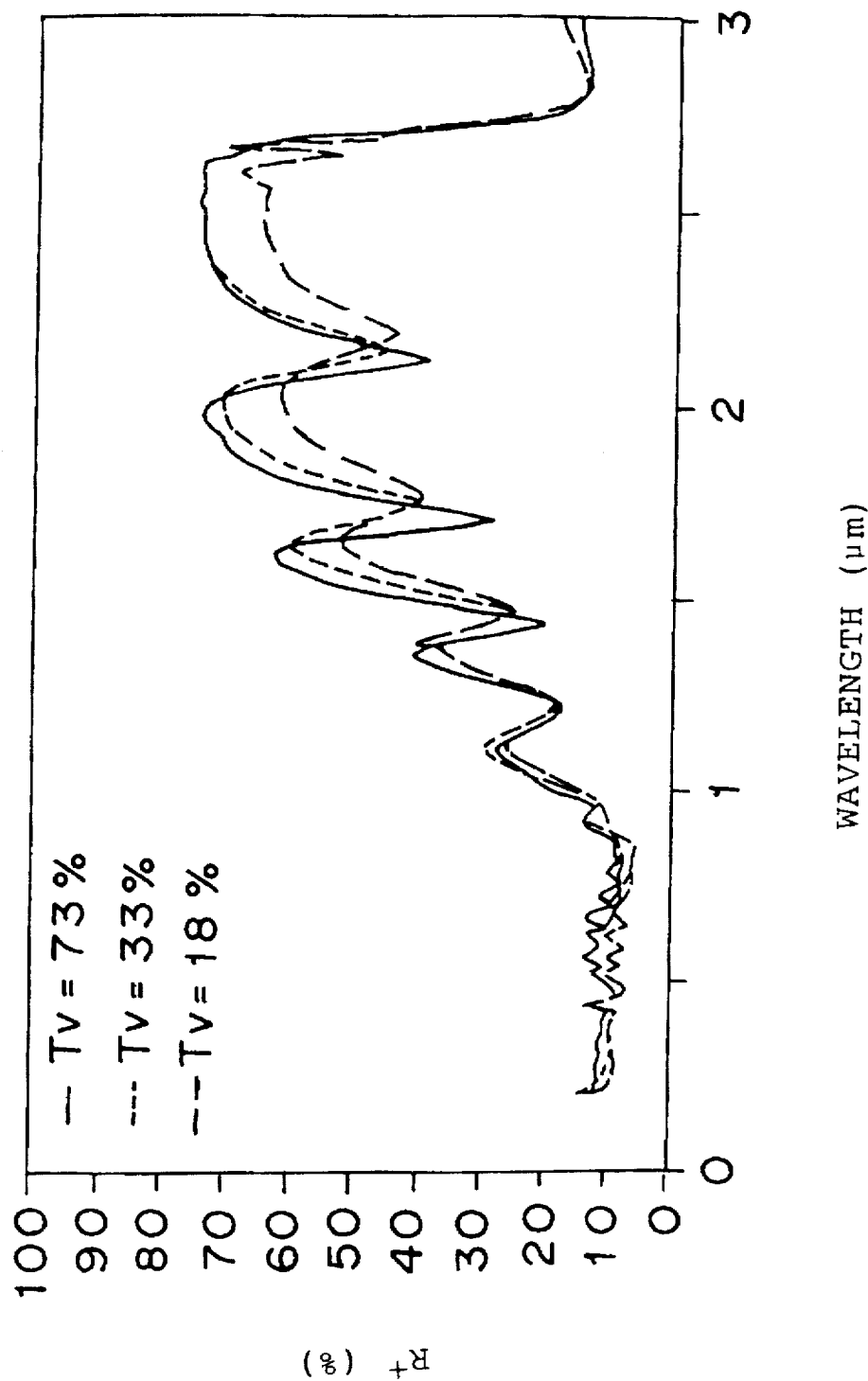
FIG. 10 represents an example of the present invention and is a graph showing the reflectance spectrum of an ECD glazing using a $SbO_{2.4}$ electrolyte (reflection from the left hand side in FIG. 1).
Figure 11:
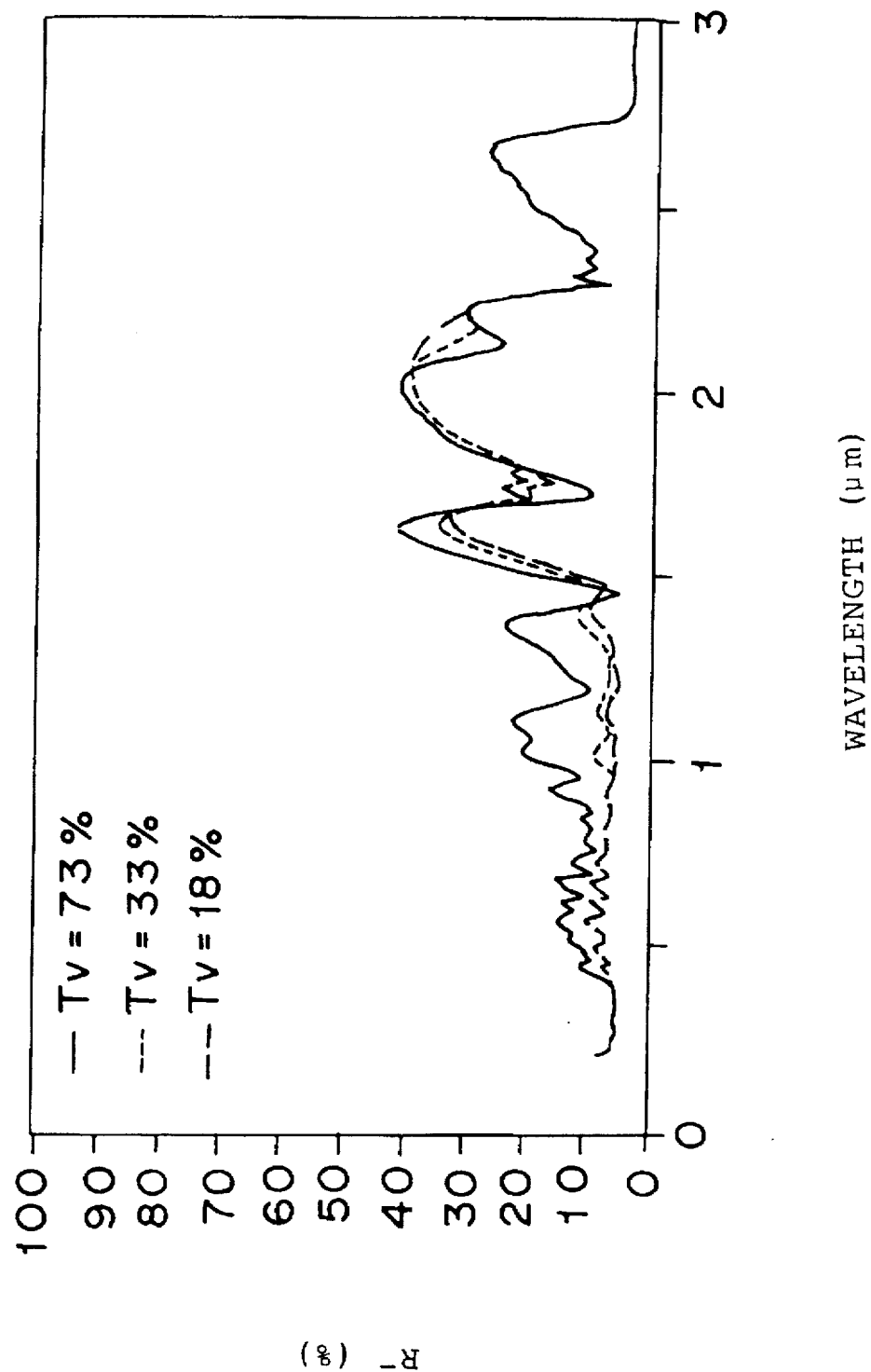
FIG. 11 represents an example of the present invention and is a graph showing the reflectance spectrum of an ECD glazing using a $SbO_{2.4}$ electrolyte (reflection from the right hand side in FIG. 1).

The optical properties of this ECD glazing due to the color forming or extinction are shown in FIGS. 9 to 11. FIG. 9 shows the transmittance T (%), FIG. 10 shows the reflectance $R^+$ (%) from the transparent substrate 1 side in FIG. 1, and FIG. 11 shows the reflectance $R^-$ (%) from the transparent substrate 8 side in FIG. 1. In FIGS. 9 to 11, $T_v$ (%) represents the visible light transmittance. In Table 3, these optical data are summarized as the visible light and sunlight transmittance and reflectance. In the Table, "v" represents the visible light, "E" represents the sunlight, "+" represents from the transparent substrate 1 side, and "−" represents from the transparent substrate 8 side.

EXAMPLE 3

Driving Systems

Figure 12:
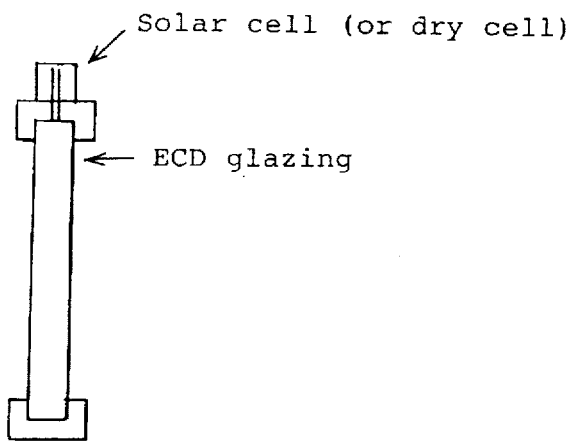
FIGS. 12(a), 12(b) and 12(c) represent examples of the present invention and show block diagrams of (a) a system for manually adjusting the transmittance, (b) a system for automatically controlling the transmittance, and (c) a system for automatically controlling the transmittance to optimize the indoor and outdoor light/temperature environmental conditions.
Figure 12:
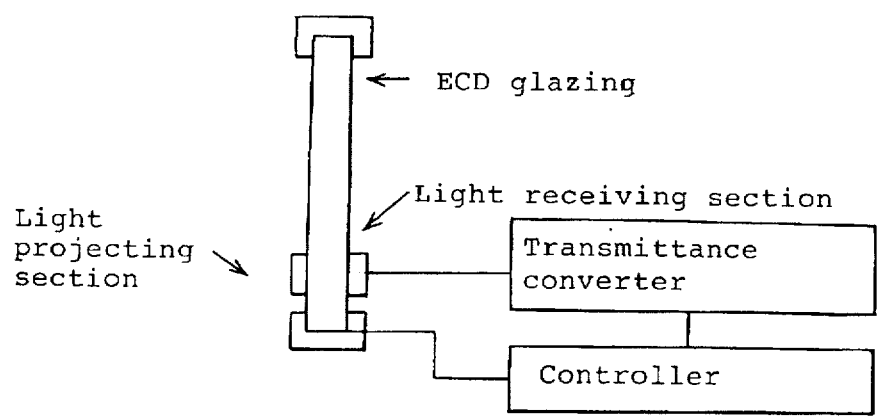
Figure 12:
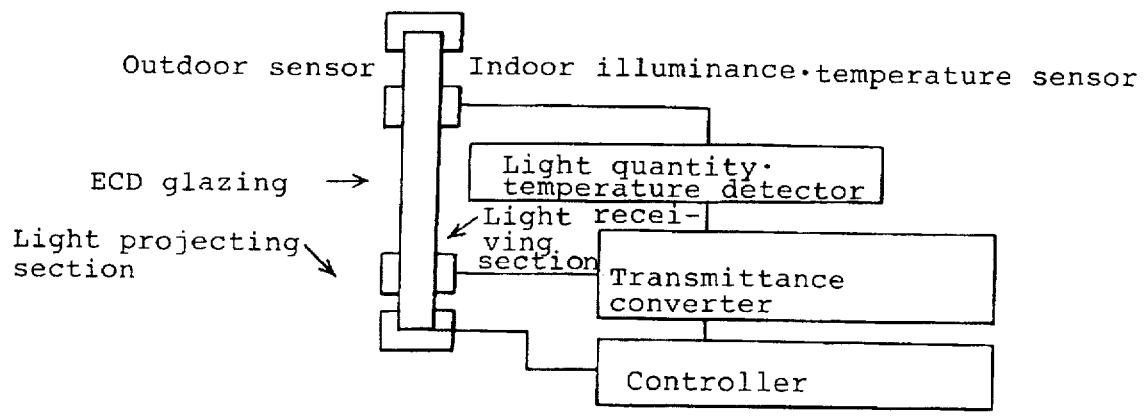

In the present invention, the driving voltage is ±1.5 V, and various driving systems as shown in FIG. 12 are conceivable. For example, typical driving methods are as follows:

(1) a dry cell (1.5 V) and a toggle switch for switching the polarity, are used (a), (2) a solar cell (output voltage: 0.7–0.8 V) is connected in series (a), and (3) a controller is operated by a commercial power source (b, c).

Further, an outdoor light intensity detecting sensor or an indoor illuminance-temperature detecting sensor may be combined with a driving power source to establish an ECD system whereby the optimum illuminance-temperature environmental conditions or energy-saving conditions can be created by a controller.

The transmittance of an ECD glazing can be externally electrically controlled. Accordingly, it is possible to construct various ECD systems to be operated under computer control. Further, it is possible to effectively utilize the solar energy (supply of the EC driving power and taking in of natural light from daylight) by a combination thereof with a see through solar cell. Here, it is preferred to arrange the ECD glazing so that the substrate 1 side in FIG. 1 is located on the indoor side, in view of the weather resistance.

Figure 13:
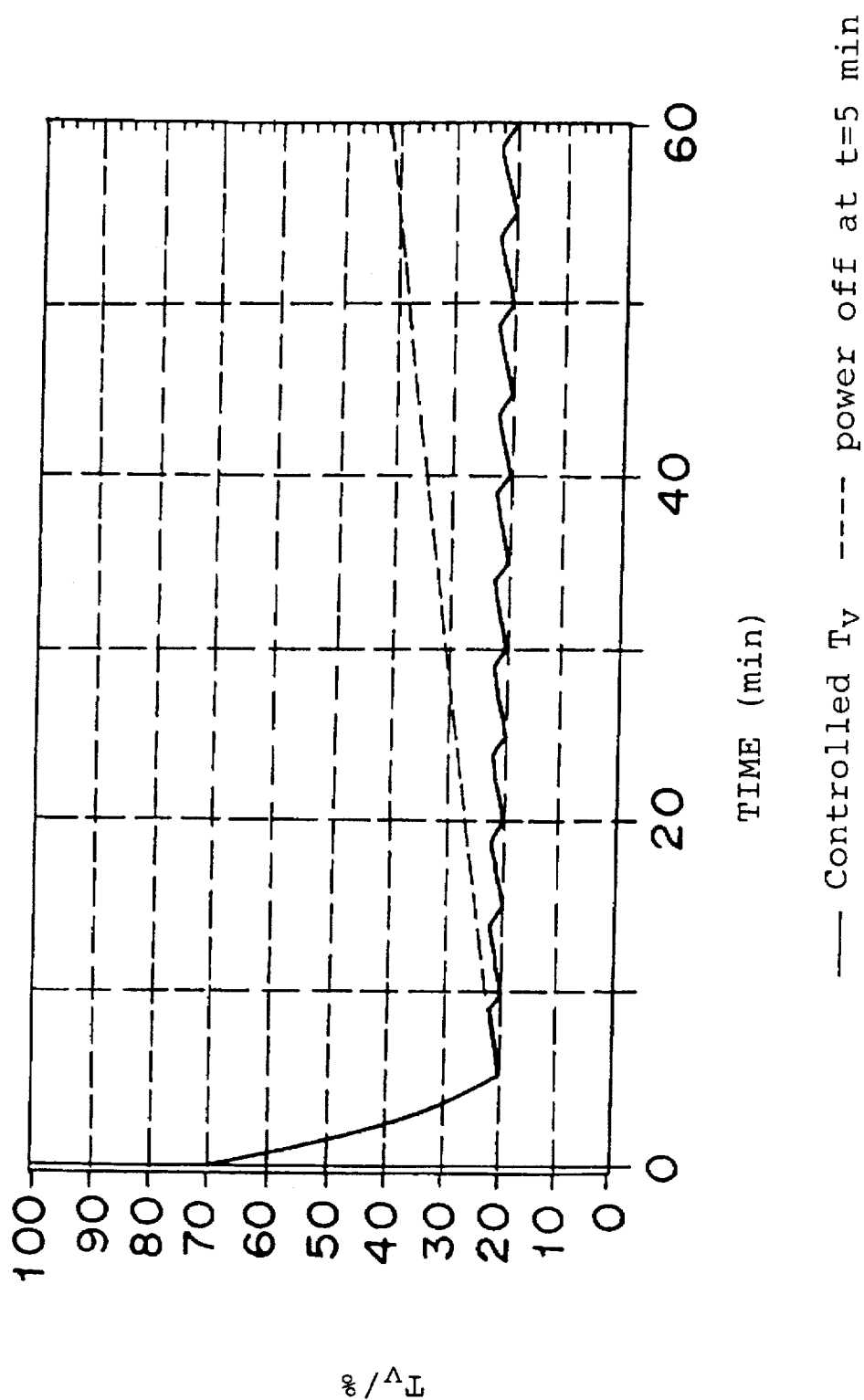
FIG. 13 represents an example of the present invention and is a graph illustrating an ECD controlling method.

As mentioned above, the ECD glazing of the present invention has a memory characteristic, whereby even if the circuit is made open after conducting an electric current to a predetermined level of transmittance, the colored state can be maintained for a while, and the transmittance can be maintained accordingly, but the color will gradually diminishes due to self discharge like other secondary batteries. For example, if the dimmer glazing is colored to a level of transmittance of 20% and then the circuit is made open, the transmittance will become 40% after 55 minutes, as shown by the dotted line in FIG. 13. However, by applying a pulse voltage every five minutes, the transmittance can be controlled and maintained within a range of from 20 to 22%, as shown by the solid line in FIG. 13.

Figure 14:
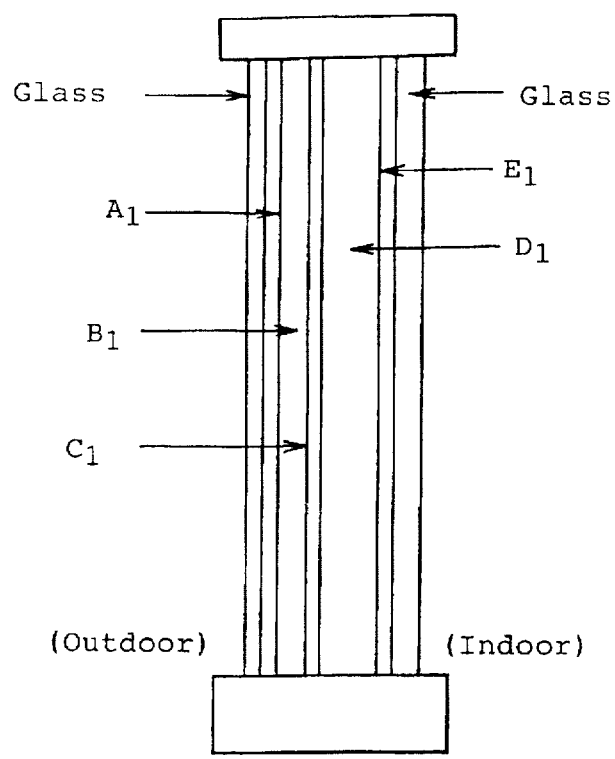
FIGS. 14(a) and 14(b) represent examples of the present invention and are cross sectional views of (a) a dimmer system for a high temperature region and (b) a dimmer system for a low temperature region.
Figure 14:
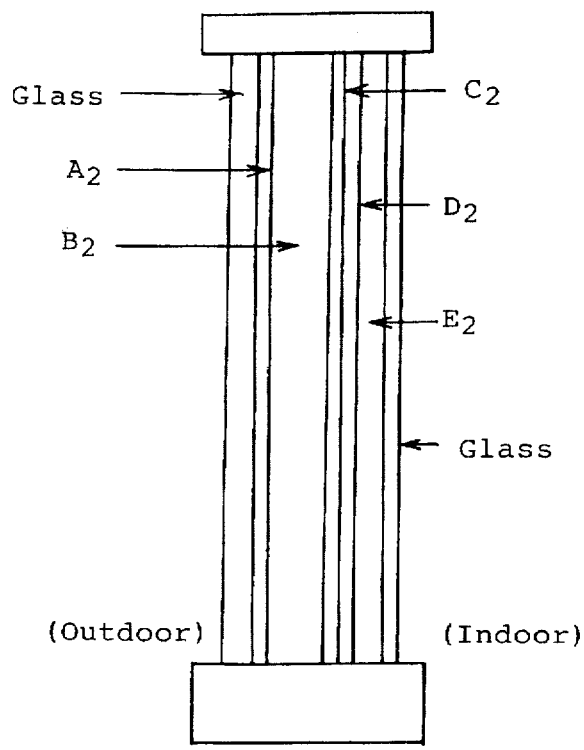

The ECD glazing of the present invention can be used alone. However, as shown in Table 3, it has a heat ray absorbing characteristic when colored, and from the viewpoint of energy saving, it is preferred that the dimmer glazing of FIG. 1 and a glass sheet having a layer of a low radiation film are laminated to form a multilayer glazing as shown in FIG. 14(a) and (b). The layer of a low radiation film may preferably be made of e.g. ITO, Sb-doped $SnO_2$ or F-doped $SnO_2$. Further, the layer of an interlayer film may preferably be made of a resin such as EVA (ethylenevinyl acetate) or PVB (polyvinyl butyral).

FIG. 14(a) illustrates a multilayer glazing which is particularly suitable for a hot region or during a hot weather, whereby the heat energy absorbed by the ECD layer in the colored state, is prevented by the low reflection film from flowing to the indoor side by irradiation, and the air conditioning load can be reduced. Specifically, the following layers are laminated from the outdoor side to the indoor side between a pair of glass sheets:

$A_1$) an electrochromic device layer of wholly solid type comprising a transparent substrate and a transparent electroconductive film formed on the substrate, and having an oxidation color forming oxide, a cation conductive layer as an electrolyte, a reduction color forming oxide and a transparent electroconductive film, formed sequentially on said transparent electroconductive film formed on the substrate, wherein:

(1) the oxidation color forming oxide is a p-type semiconductor of nickel oxide or cobalt oxide, (2) the cation conductive layer has OH groups showing a peak at about 3,300 (1/cm) in its infrared reflectance spectrum and is made of proton conductive $SbO_c$ wherein $1.3 \leq c \leq 2.7$, or at least one lithium conductive lithium-containing oxide of $LiO_dMO_e$ wherein $0.01 \leq d \leq 1.0$, $1.3 \leq e \leq 2.7$, and M is an element selected from the group consisting of Nb, Sb, B, P, Si, Ge, Al, Ce, La and Zr, and (3) the reduction color forming oxide is tungsten oxide, molybdenum oxide or titanium oxide;

$B_1$) a layer of an interlayer film (a transparent adhesive such as polyvinyl butyral or ethylenevinyl acetate);

$C_1$) a layer of a glass sheet;

D1) a layer of a dry gas; and $E_1$) a layer of low radiation film (a layer of a F-doped $SnO_2$ film).

FIG. 14(b) illustrates a multilayer glazing particularly suitable for a cold region or during a cold weather, whereby the heat energy absorbed by the ECD layer in the colored state is prevented by the low reflection film from flowing out to the outdoor side by irradiation and radiated to the indoor side, and the heat is prevented from flowing out from the indoor side to the outdoor side. Accordingly, the air conditioning load can be reduced. Specifically, the following layers are laminated from the outdoor side to the indoor side between a pair of glass sheets:

$A_2$) a layer of a low radiation film (a layer of an ITO film);

$B_2$) a layer of a dry gas;

$C_2$) a layer of a glass sheet;

$D_2$) an electrochromic device layer of wholly solid type comprising a transparent substrate and a transparent electroconductive film formed on the substrate, and having an oxidation color forming oxide, a cation conductive layer as an electrolyte, a reduction color forming oxide and a transparent electroconductive film, formed sequentially on said transparent electroconductive film formed on the substrate, wherein:

(1) the oxidation color forming oxide is a p-type semiconductor of nickel oxide or cobalt oxide, (2) the cation conductive layer has OH groups showing a peak at about 3,300 (1/cm) in its infrared reflectance spectrum and is made of proton conductive $SbO_c$ wherein $1.3 \leq c \leq 2.7$, or at least one lithium conductive lithium-containing oxide of $LiO_dMO_e$ wherein $0.01 \leq d \leq 1.0$, $1.3 \leq e \leq 2.7$, and M is an element selected from the group consisting of Nb, Sb, B, P, Si, Ge, Al, Ce, La and Zr, and (3) the reduction color forming oxide is tungsten oxide, molybdenum oxide or titanium oxide; and $E_2$) a layer of an interlayer film (a transparent adhesive such as polyvinyl butyral or ethylenevinyl acetate).

In each of the above cases of FIGS. 14(a) and (b), the daylight of sunlight can also be controlled. Accordingly, by using the EC dimer glazing of the present invention, not only the air conditioning load but also the illumination load can be reduced.

EXAMPLE 4

$TaO_{2.5}$ Electrolyte Type ECD

EXAMPLE 4-a

Preparation and Evaluation of $TaO_{2.5}$ Electrolyte

Using sodalime silica glass as the transparent substrate 1 in FIG. 1, ITO with 10 Ω/□ was coated as the transparent electroconductive film 2 thereon. Then, a $TaO_{2.5}$ film was formed thereon by DC magnetron reactive sputtering. This oxide thin film of $TaO_{2.5}$ was formed by using a Ta target having a diameter of 6 inch under a total pressure of 20 mTorr with $O_2$ gas with an applied power of from 100 to 300 W.

Figure 15:
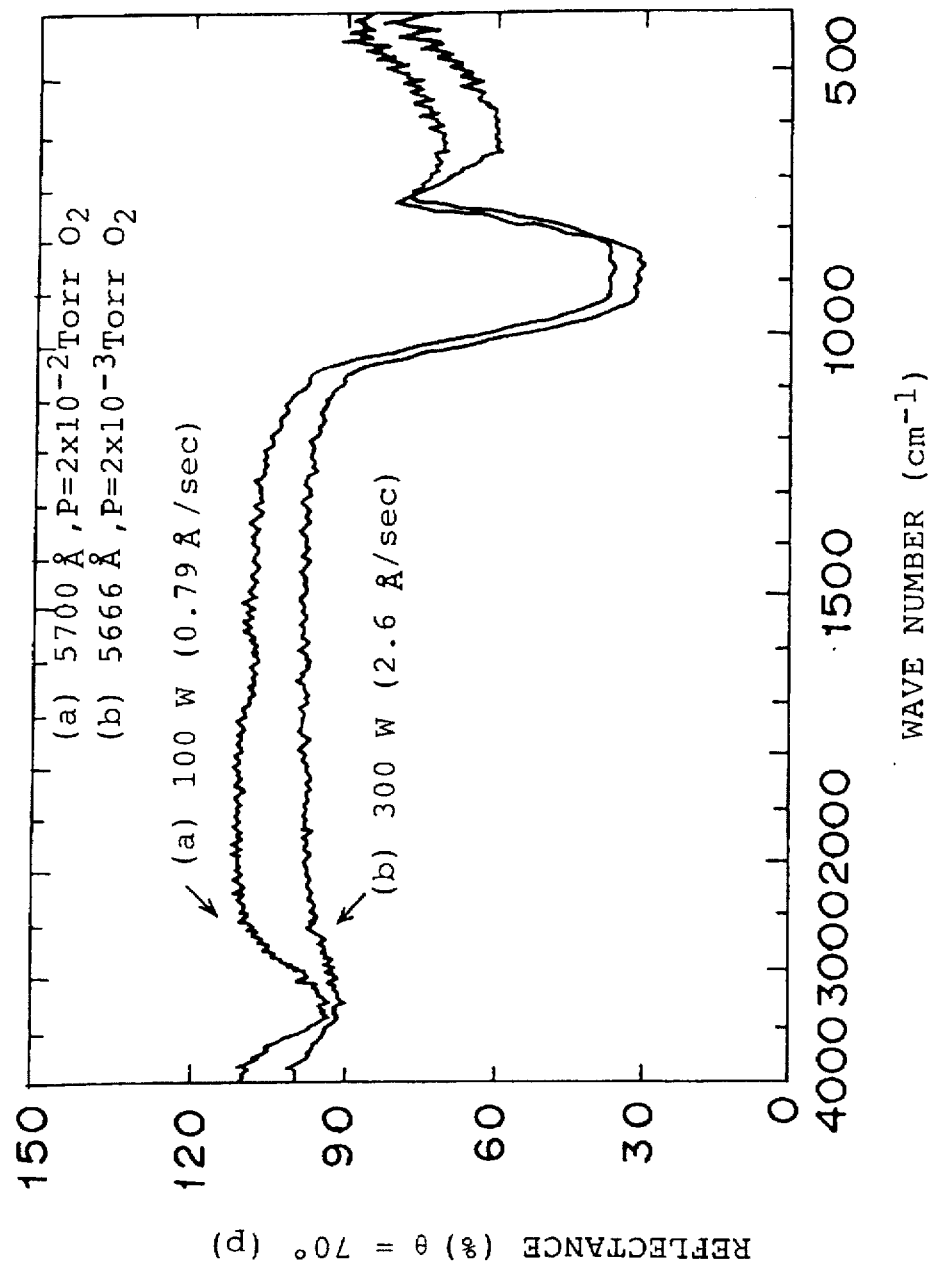
FIG. 15 represents a comparative example and is a graph showing the infrared reflectance characteristics of $TaO_{2.5}$/ITO/glass.

FIG. 15 shows the infrared reflectance spectra of $TaO_{2.5}$/ITO/glass by P-polarized light from the $TaO_{2.5}$ film side at an angle of incidence of 70°. In the Figure, spectra (a) and (b) are spectra with the applied powers of 100 W and 300 W, respectively, and the film forming speeds were 0.079 nm/sec and 0.26 nm/sec, respectively, and the film thicknesses were 570 nm and 566.6 nm, respectively. In the Figure, the absorption at about 3,300 (1/cm) is attributable to the molecular vibration of O—H of adsorbed water, and the absorption at about 900 (1/cm) is attributable to the lattice vibration of Ta—O. It is evident that when the film is formed with a low power (spectrum (a)), the adsorbed water is large.

However, the majority of such adsorbed water will be dissipated when firing is carried out at 250° C. for 30 minutes in vacuum in the film-forming step for the layer of the transparent electroconductive film 6 in FIG. 1. Accordingly, $TaO_{2.5}$ thus formed can not be said to be thermally stable as a proton electrolyte. Further, the fact that the adsorbed water becomes large as the power is low, means that the film-forming speed is slow, and such is not industrially advantageous, since the film-forming cost will thereby increase.

EXAMPLE 4-b

Preparation and Evaluation of $TaO_{2.5}$ Electrolyte Type ECD

Using a glass sheet (30×30 cm) as the transparent substrate 1 in FIG. 1, ITO with a sheet resistance of 10 Ω/□ was coated as the transparent electroconductive film 2 thereon. On such a transparent electroconductive substrate, under the film-forming conditions as identified in Table 4, a NiO film was formed as the oxidation color forming oxide 3 by electron beam vapor deposition using NiO as the starting material, and sequentially by sputtering, a $TaO_{2.5}$ film (DC sputtering using a Ta target) as the cation conductive layer 4, a $WO_3$ film (DC sputtering using a W target) as the reduction color forming oxide 5 and an ITO film (DC sputtering using an ITO target) as the transparent electroconductive film 6, were formed to obtain an ECD having a five-layer structure.

Using an EVA film (250 μm) as the transparent adhesive resin 7, a glass sheet of the transparent substrate 8 was laminated thereon by vacuum heating to obtain a laminated glazing. The peripheral seal 9 was applied by an epoxy resin seal, and the busbar electrode 10 and the busbar electrode 11 were formed by Selasolza (tradename, manufactured by Asahi Glass Company Ltd.), to obtain an ECD glazing.

Figure 16:
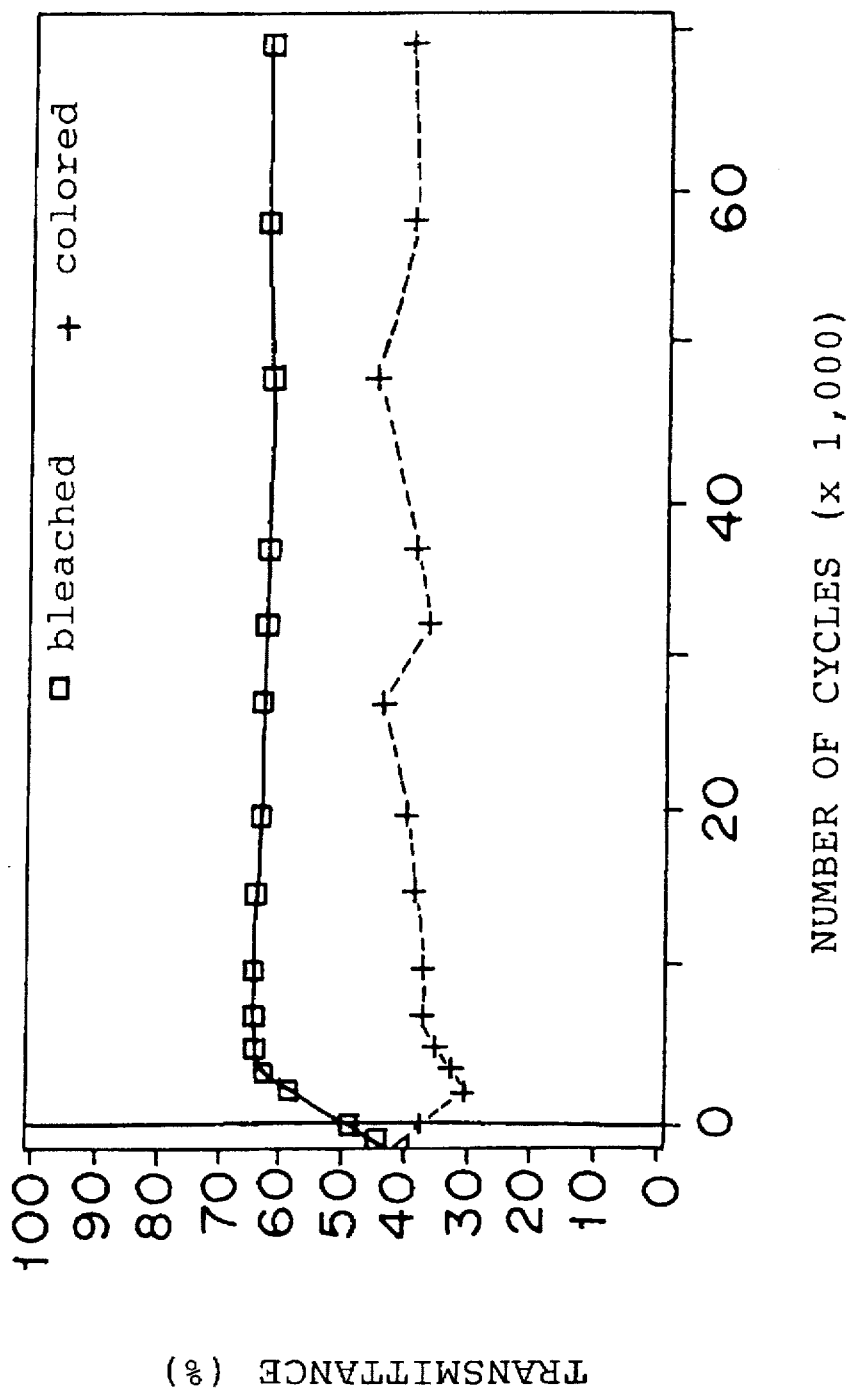
FIG. 16 represents a comparative example and is a graph showing the change in transmittance when an ECD glazing using a $TaO_{2.5}$ electrolyte was subjected to a driving test at room temperature.

FIG. 16 shows the results of a cycle driving test at room temperature of this ECD glazing. The change in the transmittance was within a range of from 40 to 50% immediately after the preparation, but as the cycle driving proceeds, the transmittance changes within a range of from 30 to 65%. Even after driving 70,000 times, no deterioration was observed on the appearance of the device. However, as shown in the same Figure, the colored transmittance undergoes a drift phenomenon in correspondence with the change of the room temperature.

When the EC device prior to laminating it into the laminated glazing, was inspected in a room, peeling of the films was frequently observed. As a result of the analysis, the peeling was observed between the $TaO_{2.5}$ film and the $WO_3$ film. Further, when exposed to an atmosphere of 60° C., this ECD glazing became non-responsive even when a voltage was applied, and it was not possible to subject it to the high temperature durability test or the weather resistance test as mentioned in Examples 1 and 2.

TABLE 1

| Film forming conditions | NiO | $LiNbO_{2.9}$ | $WO_3$ | ITO |
|---|---|---|---|---|
| Vacuumed degree (mTorr) | 0.3 | 5 | 20 | 5 |
| Gas flow rate | | | | |
| Ar (sccm) | 0 | 99 | 150 | 199 |
| $O_2$ (sccm) | 100 | 1 | 50 | 1 |
| Substrate temp. (°C.) | 120 | 25 | 25 | 150 |
| Applied power | | | | |
| Electric power (kW) | 0.4 | 3 | 2 | 2 |
| Electric current (A) | 0.04 | 6 | 3 | 6 |
| Voltage (V) | 10k | 500 | 346 | 297 |
| Film thickness (μm) | 0.5 | 0.5 | 0.6 | 0.45 |
| Film forming method | Electron beam | Sputtering | Sputtering | Sputtering |

TABLE 2

| Film forming conditions | NiO | $LiNbO_{2.9}$ | $WO_3$ | ITO |
|---|---|---|---|---|
| Vacuumed degree (mTorr) | 0.3 | 5 | 20 | 5 |
| Gas flow rate | | | | |
| Ar (sccm) | 0 | 80 | 150 | 199 |
| $O_2$ (sccm) | 100 | 120 | 50 | 1 |
| Substrate temp. (°C.) | 120 | 25 | 25 | 150 |
| Applied power | | | | |
| Electric power (kW) | 0.4 | 1.5 | 2 | 2 |
| Electric current (A) | 0.04 | 5 | 3 | 6 |
| Voltage (V) | 10k | 337 | 346 | 297 |
| Film thickness (μm) | 0.5 | 0.5 | 0.6 | 0.45 |
| Film forming method | Electron beam | Sputtering | Sputtering | Sputtering |

TABLE 3

| Optical properties | Bleached state | Intermediate state | Colored state |
|---|---|---|---|
| $T_v$ | 72.6 | 32.8 | 17.6 |
| $R_v^+$ | 10.3 | 7.2 | 7.6 |
| $R_v^-$ | 11.4 | 7.4 | 6.5 |
| $T_E$ | 54.9 | 21.5 | 10.7 |
| $R_E^+$ | 14.8 | 13.1 | 12.7 |
| $R_E^-$ | 12.3 | 7.5 | 6.8 |

TABLE 4

| Film forming conditions | NiO | $TaO_{2.5}$ | $WO_3$ | ITO |
|---|---|---|---|---|
| Vacuumed degree (mTorr) | 0.3 | 20 | 20 | 5 |
| Gas flow rate | | | | |
| Ar (sccm) | 0 | 150 | 150 | 199 |
| $O_2$ (sccm) | 100 | 50 | 50 | 1 |
| Substrate temp. (°C.) | 120 | 25 | 25 | 150 |
| Applied power | | | | |
| Electric power (kW) | 0.4 | 5 | 2 | 2 |
| Electric current (A) | 0.04 | 9 | 3 | 6 |
| Voltage (V) | 10k | 550 | 346 | 297 |
| Film thickness (μm) | 0.5 | 0.5 | 0.6 | 0.45 |
| Film forming method | Electron beam | Sputtering | Sputtering | Sputtering |

TABLE 5

| Cation conductive layer | T1 | T2 | T3 | T4 | T5 | T6 | T7 |
|---|---|---|---|---|---|---|---|
| $LiSbO_{2.9}$ | 10–70 | <5 | ○ | <5 | ○ | ○ | 5.0 |
| $LiBO_{2.0}$ | 19–70 | 5–10 | ○ | 5–10 | ○ | ○ | 2.0 |
| $LiPO_{2.9}$ | 17–71 | 5–10 | ○ | <5 | ○ | ○ | 2.0 |
| $LiSiO_{2.5}$ | 18–71 | 5–10 | ○ | 5–10 | ○ | ○ | 2.0 |
| $LiGeO_{2.5}$ | 20–71 | 5–10 | ○ | 5–10 | ○ | ○ | 2.0 |
| $LiAlO_{2.0}$ | 20–70 | 5–10 | ○ | 5–10 | ○ | ○ | 1.0 |
| $LiCeO_{2.5}$ | 20–70 | <5 | ○ | 5–10 | ○ | ○ | 1.0 |
| $LiLaO_{2.0}$ | 17–71 | <5 | ○ | <5 | ○ | ○ | 4.0 |
| $LiZrO_{2.5}$ | 20–70 | <5 | ○ | 5–10 | ○ | ○ | 2.0 |

TABLE 6

| Oxidation color forming oxide | Reduction color forming oxide | T8 | T9 | T10 |
|---|---|---|---|---|
| CoO | MoO | 15–73 | <5 | No substantial change |
| CoO | TiO | 20–73 | <5 | No substantial change |

In the ECD of the present invention, the cation conductive layer functioning as an electrolyte layer, has high proton (or high lithium) conductivity as compared with the conventional layer ($TaO_{2.5}$), whereby the changeable range in the transmittance or the reflectance of the ECD can be increased. Further, the cation conductive layer as the electrolyte layer of the present invention provides an effect such that when it is formed by a film-forming method such as electron beam vapor deposition or sputtering, the film-forming speed will be faster than ever.

Further, the ECD of the present invention is of wholly solid type. Accordingly, it is suitable for light weight modification and easy for installment or handling for transportation, and it can readily be applied to various dimmer equipments such as dimmer windows, whereby control of the incidence quantity of the solar energy through the windows of buildings or vehicles can readily be conducted. Further, it also provides excellent effects such as power peak cut, energy saving effects or amenity improvement.

What is claimed is:

1. An electrochromic device of wholly solid type comprising a transparent substrate and a transparent electroconductive film formed on the substrate, and having an oxidation color forming oxide, a cation conductive layer as an electrolyte, a reduction color forming oxide and a second transparent electroconductive film, formed sequentially on said transparent electroconductive film formed on the substrate, wherein:

(1) the oxidation color forming oxide is a p-type semiconductor of nickel oxide or cobalt oxide, (2) the cation conductive layer has OH groups showing a peak at about 3,300 (1/cm) in its infrared reflectance spectrum and is made of proton conductive $SbO_c$ wherein $1.3 \leq c \leq 2.7$, or at least one lithium conductive lithium-containing oxide of $LiO_dMO_e$ wherein $0.01 \leq d \leq 1.0$, $1.3 \leq e \leq 2.7$, and M is an element selected from the group consisting of Nb, Sb, B, P, Si, Ge, Al, Ce, La and Zr, and (3) the reduction color forming oxide is tungsten oxide, molybdenum oxide or titanium oxide.

2. The electrochromic device according to claim 1, wherein the oxidation color forming oxide is $NiO_a$ wherein $0.9 \leq a \leq 1.1$, or $CoO_b$ wherein $0.9 \leq b \leq 1.1$.

3. The electrochromic device according to claim 2, wherein the oxidation color forming oxide is NiO or CoO.

4. The electrochromic device according to claim 1, wherein the cation conductive layer is made of a hydrated oxide of $SbO_c$ wherein $1.3 \leq c \leq 2.7$.

5. The electrochromic device according to claim 4, wherein the hydrated oxide of $SbO_c$ wherein $1.3 \leq c \leq 2.7$, is $Sb_2O_3 \cdot nH_2O$, $Sb_2O_5 \cdot nH_2O$, $Sb_6O_{13} \cdot nH_2O$ or $Sb_2O_4 \cdot nH_2O$, wherein $0.01 \leq n \leq 5$.

6. The electrochromic device according to claim 1, wherein the cation conductive layer is made of $LiNbO_3 \cdot nH_2O$ wherein $0.01 \leq n \leq 10$.

7. The electrochromic device according to claim 1, wherein the transparent conductive film is made of ITO, F-doped $SnO_2$ or Ga-doped ZnO.

8. A multilayer glazing having the following layers laminated from the outdoor side to the indoor side between a pair of glass sheets:

$A_1$) an electrochromic device layer of wholly solid type comprising a transparent substrate and a transparent electroconductive film formed on the substrate, and having an oxidation color forming oxide, a cation conductive layer as an electrolyte, a reduction color forming oxide and a second transparent electroconductive film, formed sequentially on said transparent electroconductive film formed on the substrate, wherein:

(1) the oxidation color forming oxide is a p-type semiconductor of nickel oxide or cobalt oxide, (2) the cation conductive layer has OH groups showing a peak at about 3,300 (1/cm) in its infrared reflectance spectrum and is made of proton conductive $SbO_c$ wherein $1.3 \leq c \leq 2.7$, or at least one lithium conductive lithium-containing oxide of $LiO_dMO_e$ wherein $0.01 \leq d \leq 1.0$, $1.3 \leq e \leq 2.7$, and M is an element selected from the group consisting of Nb, Sb, B, P, Si, Ge, Al, Ce, La and Zr, and (3) the reduction color forming oxide is tungsten oxide, molybdenum oxide or titanium oxide;

$B_1$) a layer of an interlayer film;

$C_1$) a layer of a glass sheet;

$D_1$) a layer of a gas; and $E_1$) a layer of a low radiation film.

9. The multilayer glazing according to claim 8, wherein the low radiation film is made of Sb-doped $SnO_2$, F-doped $SnO_2$ or ITO.

10. A multilayer glazing having the following layers laminated from the outdoor side to the indoor side between a pair of glass sheets:

$A_2$) a layer of a low radiation film;

$B_2$) a layer of a gas;

$C_2$) a layer of a glass sheet;

$D_2$) an electrochromic device layer of wholly solid type comprising a transparent substrate and a transparent electroconductive film formed on the substrate, and having an oxidation color forming oxide, a cation conductive layer as an electrolyte, a reduction color forming oxide and a second transparent electroconductive film, formed sequentially on said transparent electroconductive film formed on the substrate, wherein:

(1) the oxidation color forming oxide is a p-type semiconductor of nickel oxide or cobalt oxide, (2) the cation conductive layer has OH groups showing a peak at about 3,300 (1/cm) in its infrared reflectance spectrum and is made of proton conductive $SbO_c$ wherein $1.3 \leq c \leq 2.7$, or at least one lithium conductive lithium-containing oxide of $LiO_dMO_e$ wherein $0.01 \leq d \leq 1.0$, $1.3 \leq e \leq 2.7$, and M is an element selected from the group consisting of Nb, Sb, B, P, Si, Ge, Al, Ce, La and Zr, and (3) the reduction color forming oxide is tungsten oxide, molybdenum oxide or titanium oxide; and $E_2$) a layer of an interlayer film.

11. The multilayer glass according to claim 10, wherein the low radiation film is made of Sb-doped $SnO_2$, F-doped $SnO_2$ or ITO.

* * * * *